June 28, 1932.  R. B. RESPESS  1,864,938
TRACTION MEMBER FOR AUTOMOBILE TIRES AND THE LIKE
Filed March 30, 1928
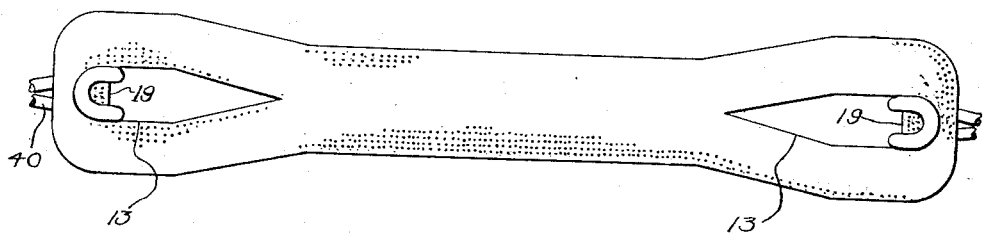
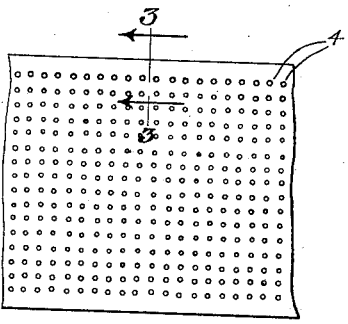
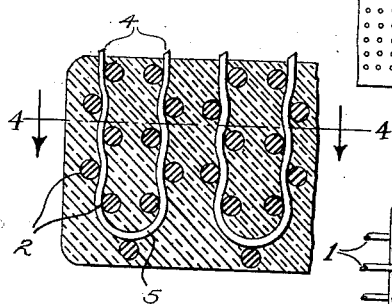
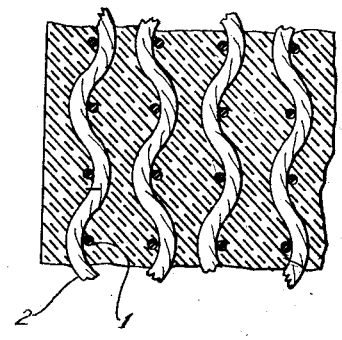
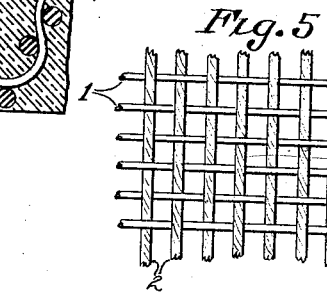
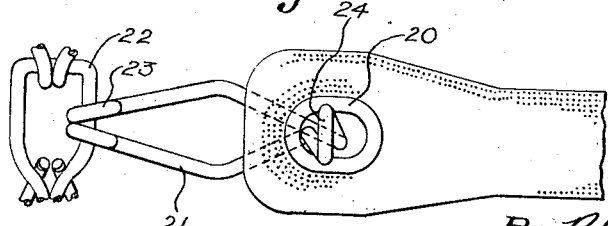
Inventor
Roland B. Respess.
By Roberts Cushman & Woodbury
Att'ys.

Patented June 28, 1932

1,864,938

UNITED STATES PATENT OFFICE

ROLAND B. RESPESS, OF WICKFORD, RHODE ISLAND, ASSIGNOR, BY MESNE ASSIGNMENTS, TO RESPATS INC., OF CRANSTON, RHODE ISLAND, A CORPORATION OF RHODE ISLAND

TRACTION MEMBER FOR AUTOMOBILE TIRES AND THE LIKE

Application filed March 30, 1928. Serial No. 265,987.

This invention relates to traction members for automobile tires or the like.

Heretofore non-skid chains have commonly been used when roadways have been too slippery to permit dependence upon the rubber tread of automobile tires for safe and satisfactory traction. Non-skid chains of this character have a plurality of cross members which tend to wear away very rapidly, particularly upon hard-surfaced highways, due to the abrasive action of the pavement upon the metal links as well as the constant movement of each link in relation to the adjoining links. Furthermore, these devices are always noisy and, upon the not infrequent breaking of a cross chain, the broken ends strike mud guards and surrounding objects with a loud clanging sound that is exceedingly unpleasant; while flying links from broken cross chains occasionally cause serious damage. Due to these disadvantages, the motoring public is reluctant to use non-skid chains except when tractive conditions are very bad. Other devices of somewhat the same general character utilize rubber cross members in place of the cross chains referred to above. These rubber cleats, however, merely accentuate the characteristics of the non-skid tread of the tire itself; accordingly this type of non-skid device while avoiding the noisy operation and rapid wear of the non-skid chains, affords little better traction than an unworn corrugated tire tread itself. Non-skid devices in use prior to this invention have therefore been incompatible with the safety, dependability and luxury of the modern motor car and have not reached a state of development consistent with that of most of the appliances and accessories used by the present-day motorist.

This invention provides traction members which possess and improve upon the desirable attributes of both the metal anti-skid elements and the rubber cleats, while obviating the unsatisfactory features of the earlier devices and affording novel and distinctive advantages over the same. To this end, I provide rubberized elements for application to a tire, which have numerous outstanding metallic portions that are adapted to penetrate any lubricating film which may be present upon a pavement and to find the minute crevices or depressions of the road surface; the multiplicity of penetrative points thus provided giving indefeasible resistance against slipping in any direction and tenaciously gripping road surfaces which otherwise would preclude the control and movement of a vehicle. The embedded metallic elements preferably are arranged in a novel manner to prevent cutting or appreciable wear of the adjoining portion of the tire and at the same time to avoid metal to metal contact with consequent friction, heating of the rubber and rapid deterioration of the same.

The improved tread members may preferably comprise rubberized fabric having wires woven into the same with myriad end portions defining the non-skid surface. Adjoining the opposite non-tractive surface of these members the wire fabric is preferably formed into folds which result in each wire portion being bent into a U-shape without sharp corners, ends or projections which might engage the adjoining portion of the tire and injure or wear the same. The wires are preferably so woven with textile fibers that they are insulated from each other and consequently metal to metal friction with the resultant heat and attendant deleterious effect upon rubber is avoided.

The road-engaging members may be conveniently installed in conjunction with circular supporting elements in such a manner that breakage of the former will result in their automatic detachment from a rotating wheel. While a broken cross member of this character will not make the objectionable noise which is commonly caused by a broken chain, even the subdued pounding which may result from the breaking of a member of this character will be promptly eliminated.

Thus the present invention provides detachable tractive elements which afford a tenacious tractive grip adapted to cut through any slimy film or to engage the most slippery of surfaces with numerous penetrative points which will provide an interlocking effect that will prevent slipping in any direction. Accordingly these devices are particularly appropriate to the present vogue of all-weather, all-year driving and may be applied to the wheels and retained upon the same during a long season of unfavorable weather, during which roadways are likely to be slippery.

A method and apparatus for manufacturing non-skid elements of the type disclosed herein is disclosed and claimed in my copending application Serial No. 265,986, filed March 30, 1928.

In the accompanying drawing which illustrates one embodiment of the invention:

Fig. 1 is a top plan view of one form of traction member;

Fig. 2 is an enlarged plan view of a portion of the anti-slip surface of the same;

Fig. 3 is a sectional detail indicated by line 3—3 of Fig. 2;

Fig. 4 is a section on line 4—4 of Fig. 3;

Fig. 5 is an enlarged view of a typical fabric which may be embodied in the tread members; and Fig. 6 is a plan view of one end of a tread member showing one mode of securing the same to a circular support.

The base material for the manufacture of non-skid members of the character exemplified in the accompanying drawing may comprise woven fabric having, for example, its weft formed of parallel steel wires, or of fine steel wires twisted with textile cords, or relatively fine wires twisted into strands without textile fibers, or relatively fine wires in parallel bundles, or an equivalent arrangement, while the warp preferably comprises twisted textile fibers that are free from wire so that each metallic strand is separated from adjoining strands which also have metal therein. Fig. 5 for example, shows fabrics of this character in which the wire weft strands are designated by the numeral 1, and in which the warp strands of strong cotton yarn or the like are designated by numeral 2. Fabric of this character may be severed into elongate strips with the wire strands running transversely thereof; the fabric being rubberized before or after the strips are formed so that in either case the fabric strips are covered with a layer of unvulcanized rubber.

The edges of this rubber layer terminate adjoining the ends 4 of the wires, which may in use project slightly beyond the remainder of the strip. The fabric strips are bent back upon themselves along a central longitudinal fold so that each wire portion 1 has an end 4 disposed at one edge of the folded strip. Thus the folded, rubberized element has one side at which each wire is provided with a U-shaped bend 5 that is free from sharp corners or projections while the opposite side is provided with a rubberized surface with numerous exposed wire ends. The bent rubberized strip thus formed is then bent back and forth upon itself or wound into a flattened spiral which is placed in a vulcanizing die, the latter being arranged to compress the material laterally but to leave the projecting wire points unaffected.

As shown in Fig. 1, openings 13 may be left at either end of the resulting tread member to receive hooked links that secure the member to the circular chain supports. These openings may each be provided with a straight outer edge 19 which engages a hooked link 40 for holding the traction member under tension and securing it to a circular supporting chain. When the tread member breaks, the tension is released and the size of the openings 13 permit the parts of the tread member readily to be disengaged from the supporting chain.

If desired, however, I may provide a single eyelet 20, Fig. 6, which is adapted to engage a novel fastening element 21 that may be secured to a circular supporting chain 22 similar to those ordinarily used for non-skid chains. One end of the element 21 is provided with a closed hook portion 23 which is clinched about one link of chain 22, while its opposite end comprises a hook element 24 formed of two heavy wire portions twisted in relation to each other. The eyelet 20 may preferably be of substantially elliptical form so that the juxtaposed wire portions of hook 24 may fit comfortably within the same, as long as their aligned diameters correspond to the longer diameter of the opening in the eyelet. The twisted formation of the hook thus permits the traction members to be swung laterally about the eyelet as a centre when they are secured to the circular supports. When these supports are applied to the wheel this lateral movement is prevented, and the outer end of hook 24 is so disposed and shaped as to insure positive retention of a traction member unless the latter breaks. However, should the traction member break after a long period of service, the tendency of the broken half thereof to twist and turn due to striking surrounding objects, such as the road, the mud guard and the like, will result in the movement of the eyelet outwardly along the correspondingly shaped outer portion of hook 24, and the broken tread portion will automatically remove itself from the support while the wheel is rotating, thus avoiding unnecessary noise and wear of adjoining portions of the vehicle.

It is evident that traction members of the character disclosed herein are provided with an inner surface which is free from wire projections or corners, i. e. which may be continuously rubberized so that there is no tendency for undue wear or cutting of the adjoining portion of the tire. The outer surfaces of these members, due to the compression of the rubber, are adapted to permit an unusually tenacious grip of the wheel upon the pavement by means of the myriad wire ends which project substantially at right angles through any lubricating film to engage the numerous irregularities in the road surface itself and indeed to make fine irregularities, if the same are lacking. Due to the relatively short projection of the numerous wire ends beyond the rubberized surface, there is little tendency for the wires to be bent out of their perpendicular position. The arrangement of wires extending in only one direction, which are insulated from each other by textile fibers, prevents excessive internal heating of the traction member during use and avoids the consequent injury to the rubber and the attendant rapid deterioration of the same. While the individual wire strands themselves may be comparatively flexible, the provision of a large number of these elements in a relatively small area permits the provision of a highly satisfactory tread member which may be made integral with the tire, if desired, or which may be used in other relations where an unusually high coefficient of friction is desirable; furthermore the wire portions continue to project outwardly a suitable distance as the fabric wears away, i. e. the respective tendencies of the fabric and the wire ends to wear not only depends upon the wearing qualities of the materials but also upon the distance that the wire projects beyond the fabric, so that this distance tends to remain substantially constant during the effective life of the traction member. The arrangement of the textile fibers so that they extend longitudinally of the traction member, i. e. transversely of the tire, permits the member to endure a long period of wear before its utility is exhausted, while the freedom from transversely extending wires permits the member to have suitable transverse flexibility to conform readily to the curved surface of the tire and to deformations that normally occur in the same.

It is evident, therefore, that the present invention provides traction members which are adapted effectively to grip the most slippery of surfaces, the cleat-like action of the entire tread member being effective in aiding this action when a comparatively soft surface is engaged, while the penetrative effect of the numerous radially disposed wire ends may be depended upon when a comparatively hard roadway is covered by a thin lubricating film or ice. Obviously, devices of this character may be long wearing and quiet in operation and therefore are particularly suitable for motor vehicles in which the other operating parts and accessories have advanced far beyond the elementary stage which corresponds to that occupied by the conventional tire chain in its field.

I claim:

1. A non-skid member comprising a strip of woven fabric rubberized and folded along its longitudinal medial, the strip being arranged in a plurality of juxtaposed sections with the raw edges defining a non-skid surface, the fabric of the strip including textile strands extending longitudinally and wire strands disposed transversely and having cut ends at the raw edges of the fabric, whereby numerous wire points are disposed at the non-skid surface and whereby the wires have U-shaped bends at the opposite surface of the tread member.

2. A non-skid member comprising a strip of woven fabric rubberized and folded along its longitudinal medial, the strip being arranged in a plurality of juxtaposed sections with the raw edges defining a non-skid surface, the fabric of the strip including textile strands extending longitudinally and wire strands disposed transversely and having ends at the raw edges of the fabric, whereby numerous wire points are disposed at the non-skid surface and whereby the wires have U-shaped bends at the opposite surface of the tread member, the textile strands being arranged to insulate the wires from each other, whereby metal to metal contact is typically avoided.

Signed by me at Boston, Massachusetts, this twenty-seventh day of March, 1928.

ROLAND B. RESPESS.